May 11, 1926. 1,583,791
F. S. McKIBBEN
REGULATOR FOR INCUBATORS
Filed Oct. 21, 1925 2 Sheets-Sheet 2
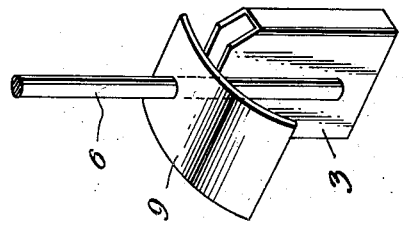
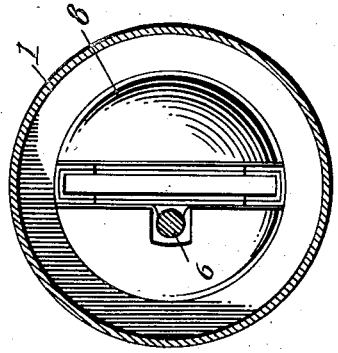
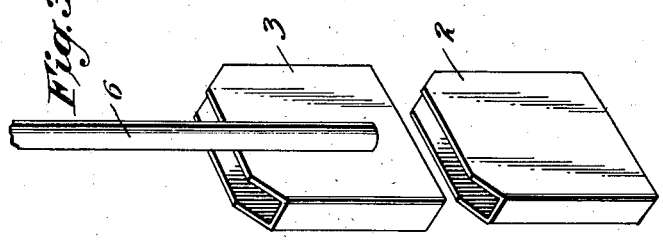
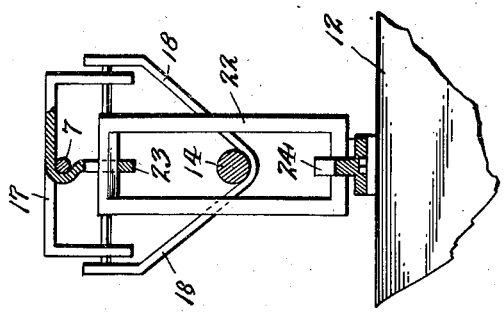
Inventor.
Frank S. McKibben Patented May 11, 1926.

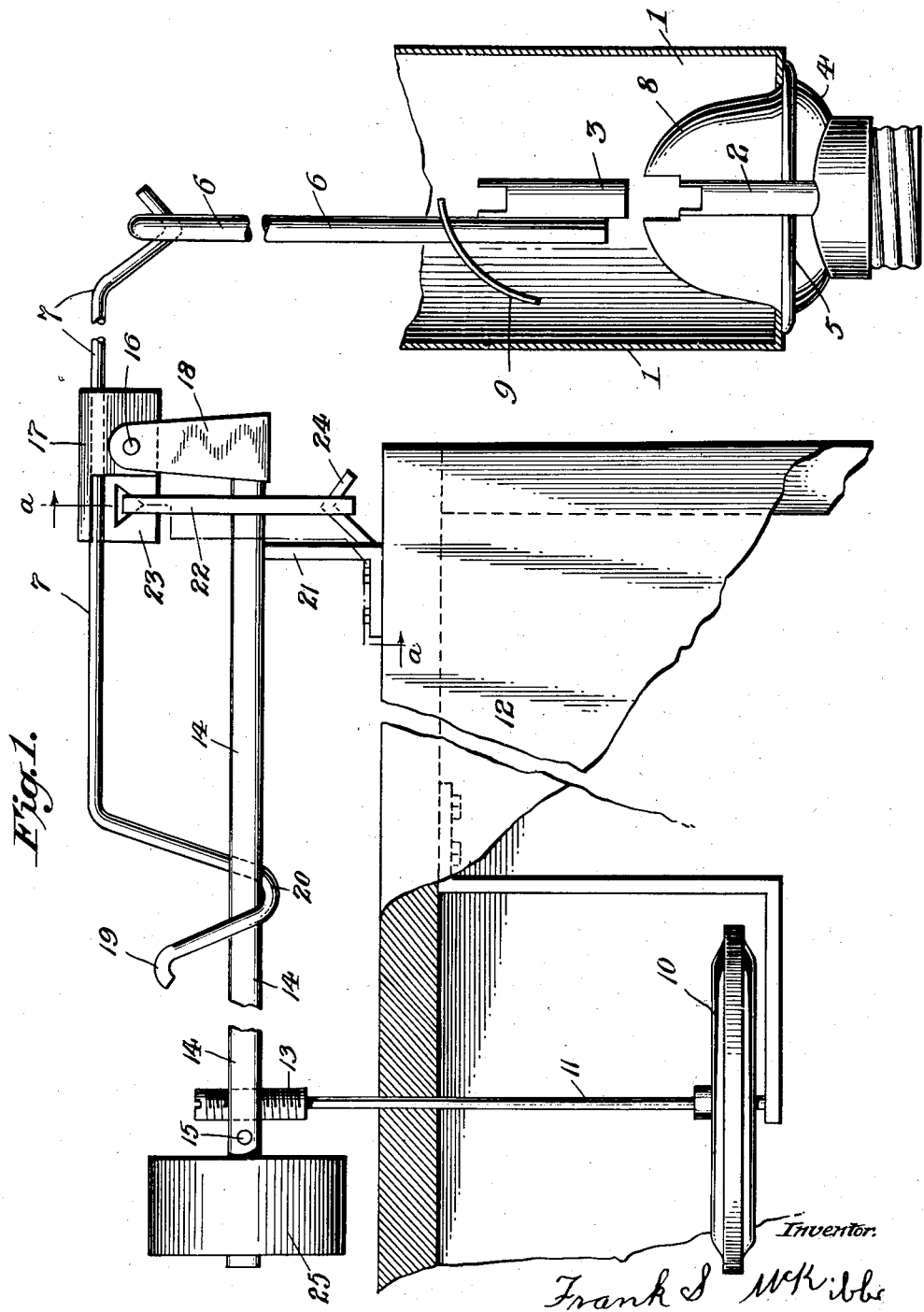

1,583,791

UNITED STATES PATENT OFFICE.

FRANK S. McKIBBEN, OF GRANDIN, MISSOURI.

REGULATOR FOR INCUBATORS.

Application filed October 21, 1925. Serial No. 63,875.

A previous application, Serial Number, 27870, May 4, 1925, was made but it did not include certain details of the invention which were then not deemed of sufficient importance. That application is now abandoned so that these minor features may be included with the more important features in one and the same application. At present the usual regulator has no control over the lamp and its value depends much upon the ability of the user to guess at conditions within the incubator and the future temperature of the room. The result is temperature varying within wide limits and frequent overheating of the eggs bringing weakness or death to the chicks. The plan is also wasteful of the oil because there must always be sufficient flame to maintain the normal temperature when the room is cool and, when it is not needed, the surplus heat is turned away from the eggs out into the room.

My invention acts directly upon the lamp so as to produce the amount of heat needed at the moment, sometimes varying very slightly under certain conditions. Sometimes the lamp flame is extremely small and sometimes extremely large without any human assistance. In this way the device avoids the overheating now so common. It renders unnecessary the watchfulness required from operators of present day incubators and removes most of the causes of their anxiety. My device may be used in connection with either the water or air plan of heating but the drawings show and the description refers to the former only.

The following description and accompanying drawings constitute the specifications of the invention; Figure 1 is a front elevation showing the entire device with some connected parts. Figure 2 is a section on the line a of Figure 1. Figure 3 is a partial side elevation showing the wick tube, sleeve and hanger. In Figure 1 and Figure 3, the sleeve and hanger are shown lifted above their normal position the better to show the parts. Figure 4 is a plan or top view of the burner cap with the hanger in place. Figure 5 is a plan or top view of the air deflector.

The lamp flue occupies the central space in the boiler or heater, as is common, but there is no cap nor damper suspended over it. The flue extends only a short distance below the boiler and fits snugly upon the lamp burner. The lower back part of it is shown at 1, Figure 1, the other portion being removed to show the working parts within. It is very necessary that the lamp be held always in the same position and not turned around. The bracket or other support for the lamp should be one that will not tilt the lamp nor allow it to sag or drop away from the flue. The lamp is of the ordinary flat wick sort but I prefer having the upper corners of the wick tube, 2, cut off at an angle of forty-five degrees and to the depth of one eighth of an inch. This makes a wider flame when the sleeve 3 is down so as to throw the heat more directly against the flue thereby heating the water more quickly and limiting the range between the high and low temperatures with the least possible movement of the sleeve. This is a factor of some importance for the successful operation of the device. The sleeve 3, fits around the wick tube 2 loosely enough that it can easily slide up and down. It excludes air extinguishing the flame as it rises and vice versa. Its upper corners are cut to correspond with the wick tube. The sleeve should be of the same length as is the wick tube above the dome shaped piece 4 of the burner and long enough that it will not admit air at its bottom when it is raised about three eighths of an inch which is the distance it rises to reduce a full flame to the smallest. It must be one inch or more long. It passes through the perforated disc 5 if one be used, which forms the floor of the burner but does not touch it, the central opening in the disc being made large for the purpose. A hanger, 6, for the support and control of the sleeve has a loop at its upper end to slip over a hook on the end of an actuating lever, 7. The hanger is represented as being made of wire but may be made of sheet metal cut to suitable shape. The lower end of the hanger, 6, may be connected to the sleeve, 3, in one of several ways but, judging by experience, I prefer brazing. In Figure 1 and Figure 3, the hanger, 6, and the sleeve, 3, are shown in proper position for brazing. The hanger, 6, passes up through the flue and through a notch or recess cut in the burner cap, 8, beside the flame slot as shown in Figure, 4. In Figure, 1, the cap is shown in section the better to show other parts. The recess virtually enlarges the flame slot and thereby retards the air draft through it. It causes the flame to rise to a long high point which smokes readily when the flame is made large by the lowering of the sleeve to maintain the proper temperature in a cold room. To correct this I attach an air deflector, 9, to the hanger, 6, so that it will be just above the cap, 8, when the hanger and sleeve are down. It is cut from sheet metal as shown in Figure, 5, and is brazed to the hanger which passes through a hole cut near one edge. When the sleeve, 3, is up, the deflector, 9, is also up but is not then needed because the flame is small but, when the sleeve is down, the flame is large and the deflector then throws a strong draft against the flame so that the long smoky point disappears. A very large flame without smoke is thus available in a cold room. A thermostat, 10, is supported by a stirrup or bracket from the top of the egg chamber and preferably near its center. A pump rod or needle, 11, passes up from the thermostat through the top of the case, 12, ending in a socket in the end of an adjusting screw, 13. This screw is placed in a long lever, 14, which is fulcrumed to the left of its middle and to the left of the screw but near it at 15. The right hand or longer arm of this lever extends nearly to the lamp flue. On the end of this longer arm is fulcrumed the shorter or secondary lever, 7, at 16. This fulcrum may be made in several ways. I like the form shown in Figures 1 and 2. A sort of saddle, 17, is cut from sheet metal and soldered to the upper side of the lever, 7. Its sides are bent down and pivoted in a way to avoid friction to a similar piece, 18, soldered to the lever, 14. The short lever, 7, is preferably made of wire. Its longer arm extends to a point over the center of the flue and at its end is formed into a hook to receive the loop on the upper end of the hanger, 6. The left hand and somewhat shorter arm of the secondary lever, 7, is bent downward and then wound loosely once around the lever, 14, so as to form one coil of a helix. The highest part of the helix comes in contact with the upper side of the primary lever, 14, to limit the upward movement of the sleeve and therefore is the upper helical stop, 19. In like manner the lowest part of the helix is the lower helical stop, 20, because it contacts with the under side of the primary lever, 14, and checks the downward movement of the sleeve, 3, making it coincide with that of the lever, 14, till fully stopped by contact of the latter with the bottom stop, 21. The helix is only for forming the stops, 19 and 20, and holding them in place. The lever, 7, may be cut in suitable form from sheet metal and the stops may then be bent to put them in proper position for contacting with the lever, 14, without the use of a helix. The bottom stop, 21, is a simple piece of metal secured to the case, 12, on which the lever, 14, rests when the thermostat is too cold to support it. A bridle, 22, is connected at its upper end to the secondary lever, 7, one tenth or one eighth as far to the left of its fulcrum as is the hook in the opposite direction. This connection may be made by means of a part, 23, of the fulcrum saddle, 17. At its lower end the bridle, 22, is held in place by a hook, 24, under which it hangs. The hook, 24, may be cut from the central portion of the bottom stop, 21, and bent over as shown in Figures 1 and 2. These connections should be loose enough to avoid friction. The bridle, 22, may be made of wire or cut from sheet metal and knife edge bearings at both ends will be very desirable. A balancing weight, 25, is so placed on the left hand arm of the primary lever, 14, that it will almost but not quite balance the opposite arm and all it carries leaving only enough unbalanced weight to cause the sleeve, 3, to descend promptly when the thermostat contracts only a very little under a lowering temperature. Without the weight a much stronger thermostat would be necessary.

Several other adjustments must be made. When the lower helical stop, 20, is in contact with the primary lever, 14, and the latter rests on the bottom stop, 21, the hook on lever, 7, must be at the proper height to hold the sleeve, 3, just clear of the dome shaped base, 4, of the burner or barely touching it. To so adjust it, the stop, 20, should be held against the lever, 14, and the latter upon the stop, 21, without springing it and while so held, the lever, 7, may be bent till the hook is in the proper position. When the lever, 14, rises from the stop, 21, under the influence of the thermostat, 10, the hook on the lever, 7, which supports the sleeve, 3, rises slowly as if formed fixedly on lever, 14. But, as soon as the connections of the bridle, 22, become tightened at about the temperature of 102 degrees, it prevents further rise of that part of the lever, 7, to which it is connected at 23. For this purpose the lower connection of the bridle may be adjusted at the same time when the height of the hook on lever, 7, is adjusted as above described. While the parts are held as mentioned, the hook, 24, under which the lower end of the bridle, 22, hangs, may be bent up or down till the bridle is tight but not tight enough to draw the stop, 20, out of contact with the lever, 14. After the tightening of the bridle connections, the sleeve, 3, is made to rise more rapidly by the action of lever, 7, till the upper helical stop, 19, comes down and meets the lever, 14, thereby stopping the upward movement of both the levers and the sleeve. This rising of the sleeve reduces the largest flame the lamp can produce to the smallest that can burn without going out. This is the pilot flame and the contact of the stop, 19, with the lever, 14, prevents its complete extinguishment. If the flame be thus reduced to pilot flame size before the contact of stop and lever, the stop should be bent over further away from the fulcrum, 16, but if the contact occur first, the stop should be bent toward the fulcrum.

To cause the pilot flame to be formed at the proper normal temperature, another adjustment must be made. It can be completed only when the temperature is at the normal degree. If a pilot flame occurs before the desired degree is reached, the adjusting screw, 13, must be turned to the left, opposite to the way clock hands move. This will lower the sleeve, enlarge the flame and raise the temperature. But if a pilot flame be not made till after the proper temperature shall have been reached, then turn the screw to the right. After these adjustments have been made, the unassisted regulator will always make a pilot flame whenever the temperature shall have reached the degree for which the screw has been set provided the flame itself shall have been measured or the daily pilot flame shall have been made by the user which will be presently described.

All the adjustments so far described should be carefully made at the factory. The ultimate owner and user will have no need to change any of them and will not need to know anything about them. He will not need a thermometer unless to satisfy his curiosity. The only adjustment with which the user will need to be concerned is the making of a daily pilot flame each time the lamp is replaced after being refilled and cleaned. In other words, making the daily pilot flame is the measuring of the size of the flame that will, in case of need, be available for the use of the regulator the following twenty-four hours. The daily pilot flame must be made in a way that is somewhat similar to some adjustments already described to be made but once and at the factory. The incubator should be warm but not necessarily at the normal degree. With right thumb and finger on the wick wheel, place a left finger under the end of the primary lever, 14, and lift it slowly till the upper helical stop, 19, contacts with the lever, watching the flame, meanwhile, and turning it higher if need be to prevent extinguishment. Since a small flame becomes smaller as the burner cools, the levers should be held in this their highest position for a minute or two. Then the wick should be carefully turned up or down to produce the smallest flame that can burn without going out. Then the levers are to be lowered as far as they will go. The flame will immediately come under complete control of the thermostat.

In further explanation of this device, I will add that the pilot flame produces so little heat that it can not be measured by a thermometer in the egg chamber, therefore, under all ordinary circumstances the temperature begins falling soon after the pilot flame is made. When the temperature falls about one fourth of a degree the sleeve begins to descend and the flame begins to grow. By the time the temperature reaches 102 degrees, when the screw is set at 103 degrees, the sleeve reaches its lowest position and the flame is at its full size although the temperature may not begin to rise till the water has had time to become heated. The only exception occurs during the last few days of incubation when if the room is kept too warm, the chicks themselves produce enough heat to maintain the normal temperature.

I claim as new the following:

1. In an incubator regulator, the combination of a wick tube, 2, a sleeve, 3, sliding thereon, an actuating lever, 7, a hanger, 6, connecting said sleeve to said lever and a burner cap, 8, having a recess beside the flame slot for the free movement of said hanger, whereby a movement, approximately frictionless and of suitable extent and rapidity, is obtained for said sleeve from a lever mechanism located above said cap.

2. In an incubator regulator, the combination of a wick tube, 2, a sleeve, 3, sliding thereon, an actuating lever, 7, a hanger, 6, connecting said sleeve to said lever, a recessed burner cap, 8, for the free passage of said hanger and an air deflector, 9, attached to said hanger above said cap, whereby a movement, approximately frictionless and of suitable extent and rapidity is obtained for said sleeve from a lever mechanism located above said cap and without the smokiness that would otherwise be caused by the recess in said cap.

3. In an incubator regulator, the combination of a thermostat, 10, a primary lever, 14, fulcrumed at 15, near said thermostat and actuated by it, a secondary lever, 7, fulcrumed at 16 on end of primary lever, 14, and actuated by it, a wick tube, 2, a sleeve, 3, sliding thereon, a hanger, 6, supported and actuated by the end of said secondary lever and supporting said sleeve, a stop, 20, on said secondary lever to support said sleeve by its contact with said primary lever and a fixed stop, 21, on which said lever, 14, may rest; the purpose of the combination being to provide an approximately frictionless movement for said sleeve and hold it in suspension in its lowest position when said thermostat is too cold to do so.

4. In an incubator regulator, the combination of a thermostat, 10, a primary lever, 14, actuated by said thermostat, and fulcrumed near it at 15, a secondary lever, 7, fulcrumed at 16, on end of primary lever, 14, a hanger, 6, supported and actuated by the end of secondary lever, 7, a wick tube, 2, a sleeve, 3, thereon, supported by said hanger, a bridle, 22, connected at its lower end to a fixed object, 24, and at its upper end to said secondary lever, 7, near its fulcrum, 16, at 23, opposite to said hanger, the purpose of the combination being to provide a frictionless movement for said sleeve with sufficient rapidity and extent to reduce the flame from the largest size to the smallest by such expansion of the thermostat as is caused by a rise in temperature of about one degree and vice versa.

5. In an incubator regulator, the combination of a thermostat, 10, a primary lever, 14, actuated by said thermostat and fulcrumed near it at 15, a secondary lever, 7, fulcrumed at 16, on the end of lever 14, a hanger, 6, supported by the end of lever 7, a wick tube, 2, a wick tube sleeve, 3, supported by said hanger, a bridle 22, connected at its lower end to a fixed object, 24, and at its upper end to said secondary lever near its fulcrum and opposite to said hanger, a stop, 19, on end of secondary lever, 7, contacting with lever, 14, to prevent further movement of both levers, the purpose of the combination being to provide a frictionless movement for said sleeve with sufficient rapidity and extent to reduce the flame from the largest size to the smallest by such expansion of the thermostat as is caused by a rise in temperature of about one degree without extinguishment.

6. In an incubator regulator, the combination of a thermostat, 10, a primary lever, 14, actuated by said thermostat and fulcrumed near it at 15, a secondary lever, 7, fulcrumed at 16, on the end of said primary lever, 14, a hanger, 6, supported and actuated by end of secondary lever, 7, a wick tube 2, a sleeve, 3, thereon, supported by said hanger, a bridle, 22, connected at its lower end to a fixed object, 24, and at its upper end to said secondary lever near its fulcrum, 16, and opposite to said hanger, a stop, 19, on end of secondary lever, 7, and an adjusting screw, 13, in said lever 14, and bearing on said thermostat, the purpose of the combination being to provide a frictionless movement for said sleeve having sufficient rapidity and extent to reduce the flame at said wick tube from the largest size to the smallest by such expansion of the thermostat as is caused by a rise in temperature of one degree without extinguishment and at any desired degree at which said screw may have been set.

7. In an incubator regulator the combination of a primary lever, 14, fulcrumed at an intermediate point, 15, a secondary lever, 7, fulcrumed at 16, in the right hand end of said primary lever, 14, a secondary lever, 7, fulcrumed at 16, on said right hand end of said primary lever, 14, a bridle, 22, supported by said secondary lever, a hanger, 6, supported at end of secondary lever, a wick tube, 2, a sleeve, 3, thereon, supported by said hanger, and a balancing weight, 25, on the left hand end of said primary lever, 14, that will almost balance all the weight on the opposite end of said lever, 14, leaving only enough unbalanced weight to cause the prompt descent of the sleeve when the thermostat contracts only a very little under a lowering temperature.

8. In an incubator regulator the combination of a thermostat, 10, a primary lever, 14, actuated by said thermostat and fulcrumed near it at 15, a secondary lever, 7, fulcrumed on 16, supported and actuated by said primary lever, 14, a hanger, 6, supported from one end of said secondary lever, a wick tube, 2, a sleeve, 3, sliding thereon, and supported by said hanger, a bridle, 22, connected at its lower end to a fixed object, 24, and at its upper end to said secondary lever, 7, near its fulcrum but opposite to said hanger, a burner cap, 8, having a recess beside the flame slot for the passage of said hanger and an air deflector, 9, attached to said hanger over said cap, the purpose of the combination being to cause the proper movement of said sleeve by means of a thermostat controlled mechanism, approximately frictionless and located above said burner cap.

FRANK S. McKIBBEN.